United States Patent [19]

Strader

[11] 4,196,918
[45] Apr. 8, 1980

[54] UTILITY TRAILER FRAME ASSEMBLY

[75] Inventor: Don S. Strader, Marietta, Ga.

[73] Assignee: Motor Wheel Corporation, Lansing, Mich.

[21] Appl. No.: 906,489

[22] Filed: May 17, 1978

[51] Int. Cl.² ............................................. B60D 1/14
[52] U.S. Cl. ................................. 280/478 R; 267/41; 280/491 A
[58] Field of Search ........................ 296/28 R, 26, 27; 280/491 A, 489, 478 R, 478 A, 491 R; 267/41

[56] References Cited

U.S. PATENT DOCUMENTS

| | | | |
|---|---|---|---|
| 1,835,436 | 12/1931 | Shaw | 280/478 A |
| 2,080,709 | 5/1937 | Hall et al. | 280/401 |
| 2,163,653 | 6/1939 | Wittman | 244/104 LS |
| 2,353,999 | 7/1944 | Counts | 280/478 R X |
| 2,469,506 | 5/1949 | Kerr et al. | 280/489 |
| 2,490,184 | 12/1949 | Wojtech, Jr. | 267/41 |
| 2,534,722 | 12/1950 | Meiklejohn, Jr. et al. | 267/41 |
| 2,819,768 | 1/1958 | Barenyi | 180/55 |
| 2,826,425 | 3/1958 | Hoeper | 280/656 |
| 2,876,036 | 3/1959 | Olson | 296/173 |
| 2,896,969 | 7/1959 | Carty | 280/491 A |
| 2,916,302 | 12/1959 | Lippitt | 280/491 E |
| 3,002,742 | 10/1961 | Troy | 267/38 |
| 3,081,125 | 3/1963 | Peterson | 296/173 |
| 3,279,819 | 10/1966 | Edmonds | 280/478 |
| 3,378,280 | 4/1968 | Harms | 280/478 |
| 3,442,268 | 5/1969 | Symes | 280/63 X |
| 3,572,764 | 3/1971 | Rubin | 280/491 |
| 3,612,600 | 10/1971 | Salichs | 296/173 |
| 3,781,030 | 12/1973 | Ekedal | 280/491 X |
| 3,784,230 | 1/1974 | Worrall, Jr. | 280/491 |
| 3,917,316 | 11/1975 | Furnish | 280/460 R |
| 3,979,133 | 9/1976 | Morris | 280/42 |

*Primary Examiner*—Joseph F. Peters, Jr.
*Assistant Examiner*—Michael Mar
*Attorney, Agent, or Firm*—Barnes, Kisselle, Raisch & Choate

[57] ABSTRACT

A knock-down utility trailer frame and suspension system characterized by an elongated hollow spine adapted to extend lengthwise of a trailer body, and a trailer hitch draw tongue carried within the spine and slideable longitudinally therein between extended and retracted positions. The hitch tongue is wedged in the extended position by cooperating compression pads on the tongue and in the encompassing spine which simultaneously capture a pair of wheel-mounting leaf springs on corresponding studs disposed within the trailer spine. As the tongue is moved to the retracted position, the tongue portion which captures the leaf springs move axially of the studs, whereupon the leaf springs and corresponding wheels may be disengaged from the trailer spine for storage.

22 Claims, 9 Drawing Figures

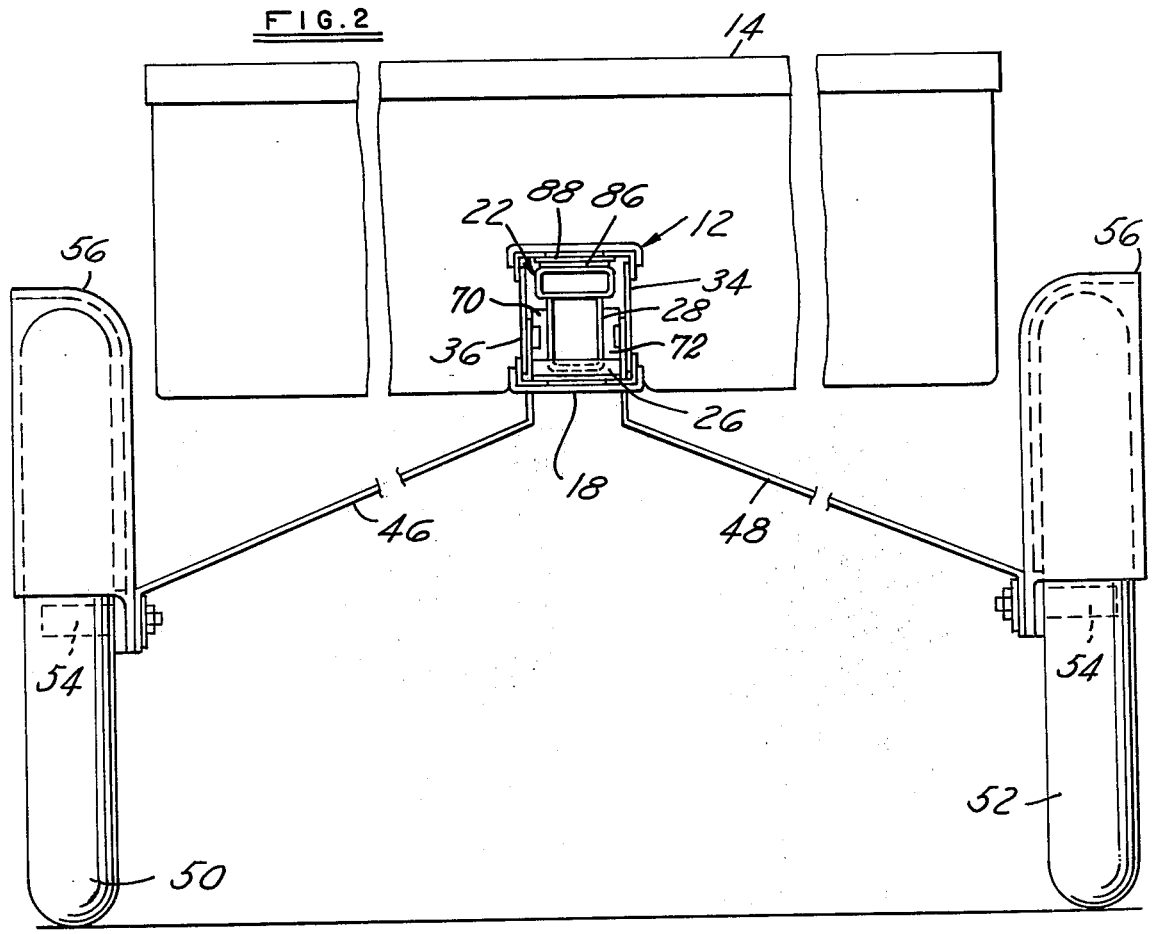
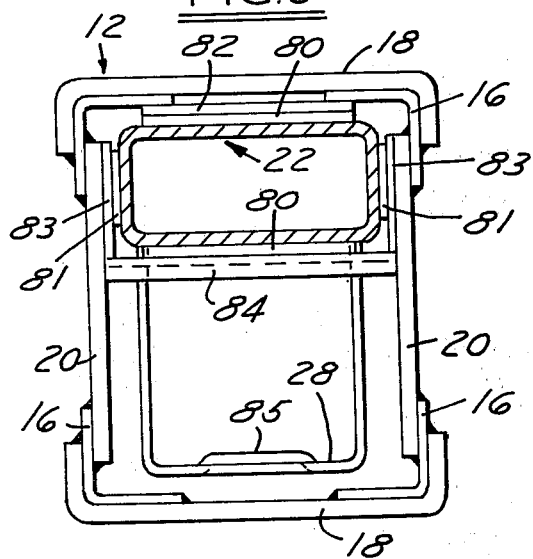
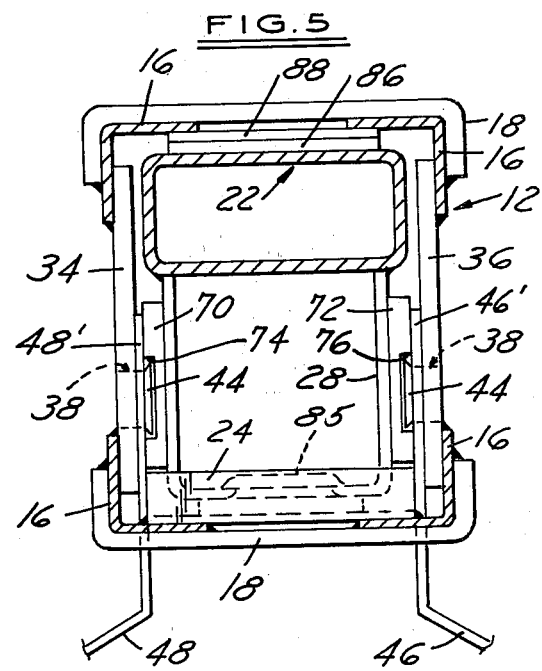

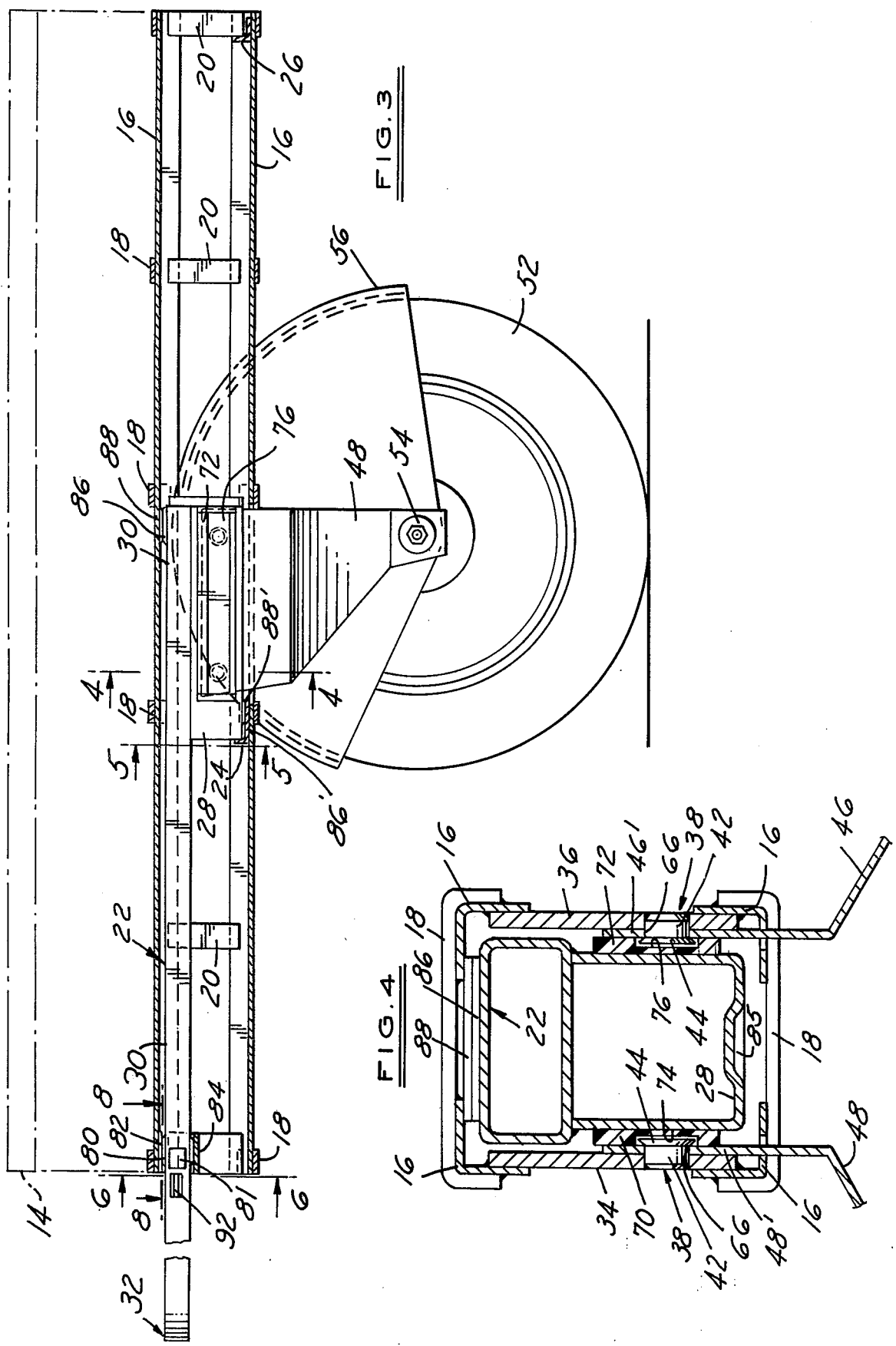

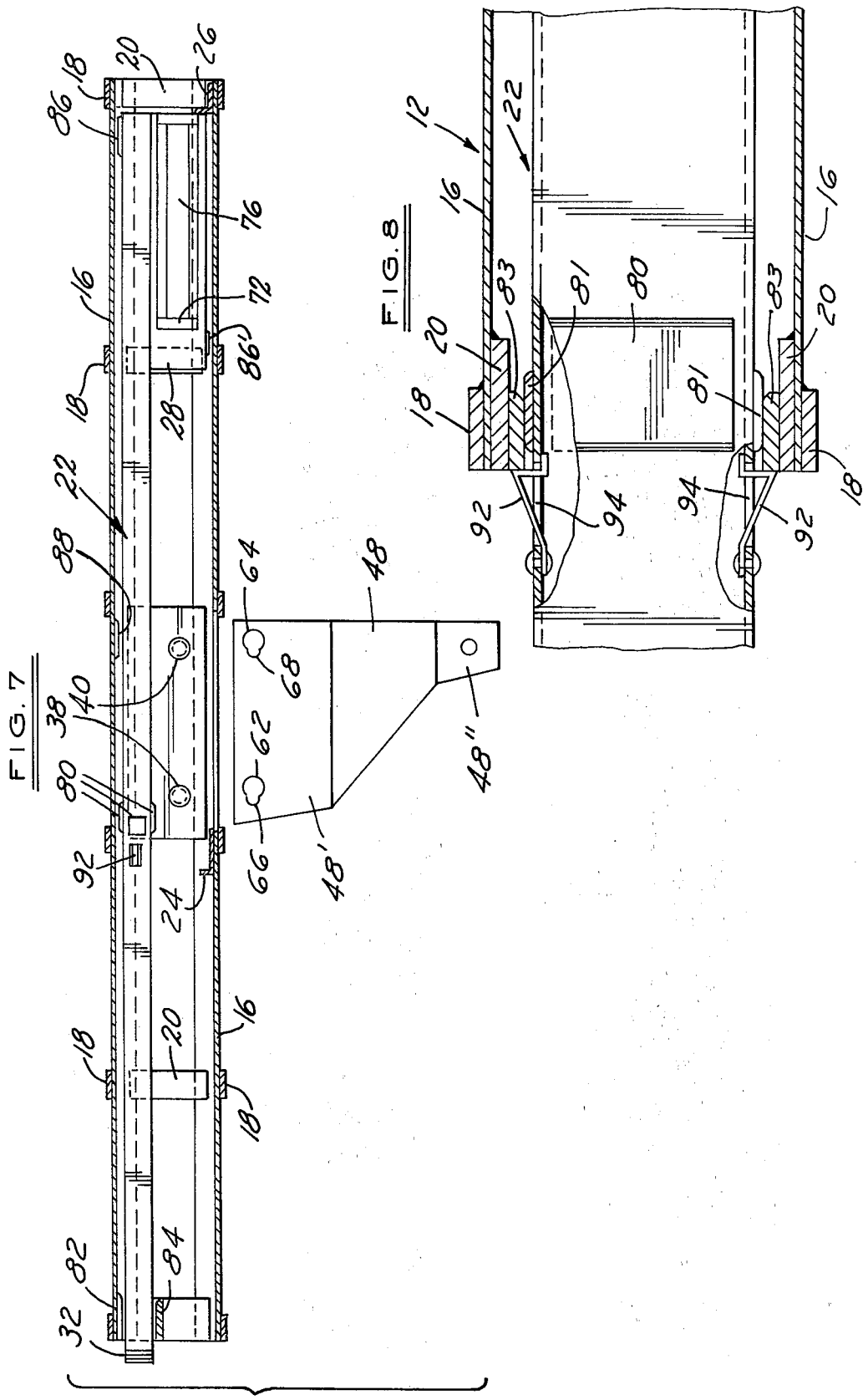

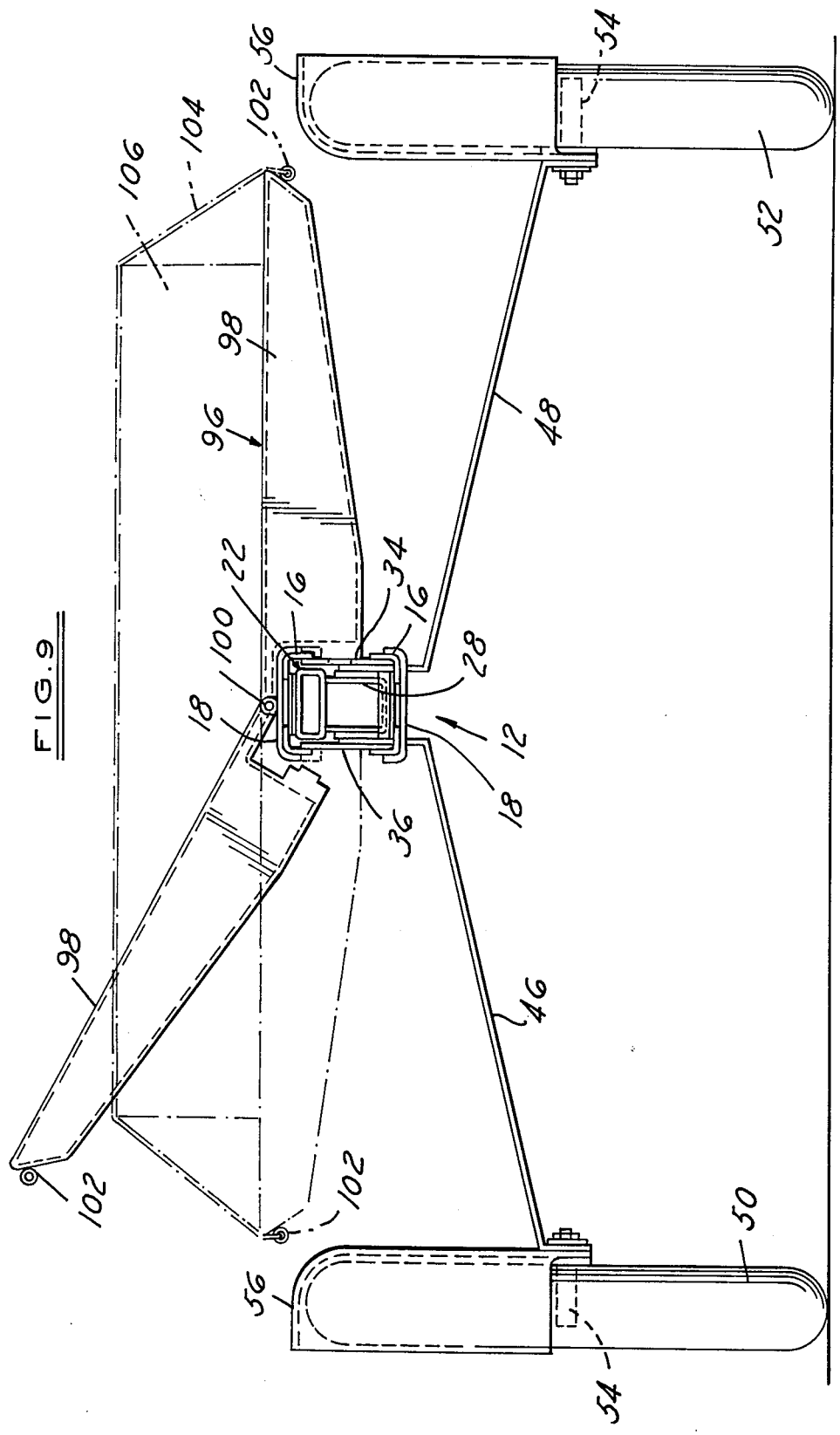

UTILITY TRAILER FRAME ASSEMBLY

The present invention is directed to utility trailers, and more particularly to utility trailer frame assemblies which may be disassembled or knocked-down to facilitate storage during periods of non-use.

A general object of the present invention is to provide a utility trailer, specifically a trailer frame and suspension system, which occupies a minimum of storage space during periods of non-use and which, when in the functional or assembled condition, provides a sturdy, lightweight trailer frame capable of carrying substantial loads.

A more specific object of the invention is to provide a utility trailer frame assembly of the described type which may be readily assembled and/or disassembled by relatively unskilled members of the consuming public.

The invention, together with additional objects, features and advantages thereof, will be best understood from the following description, the appended claims and the accompanying drawings in which:

FIG. 2 is a rear elevational view of a trailer including a trailer frame and suspension system in accordance with the invention;

FIG. 3 is a side sectional of the frame assembly illustrated in FIG. 2 with the draw tongue extended;

Figure 1:
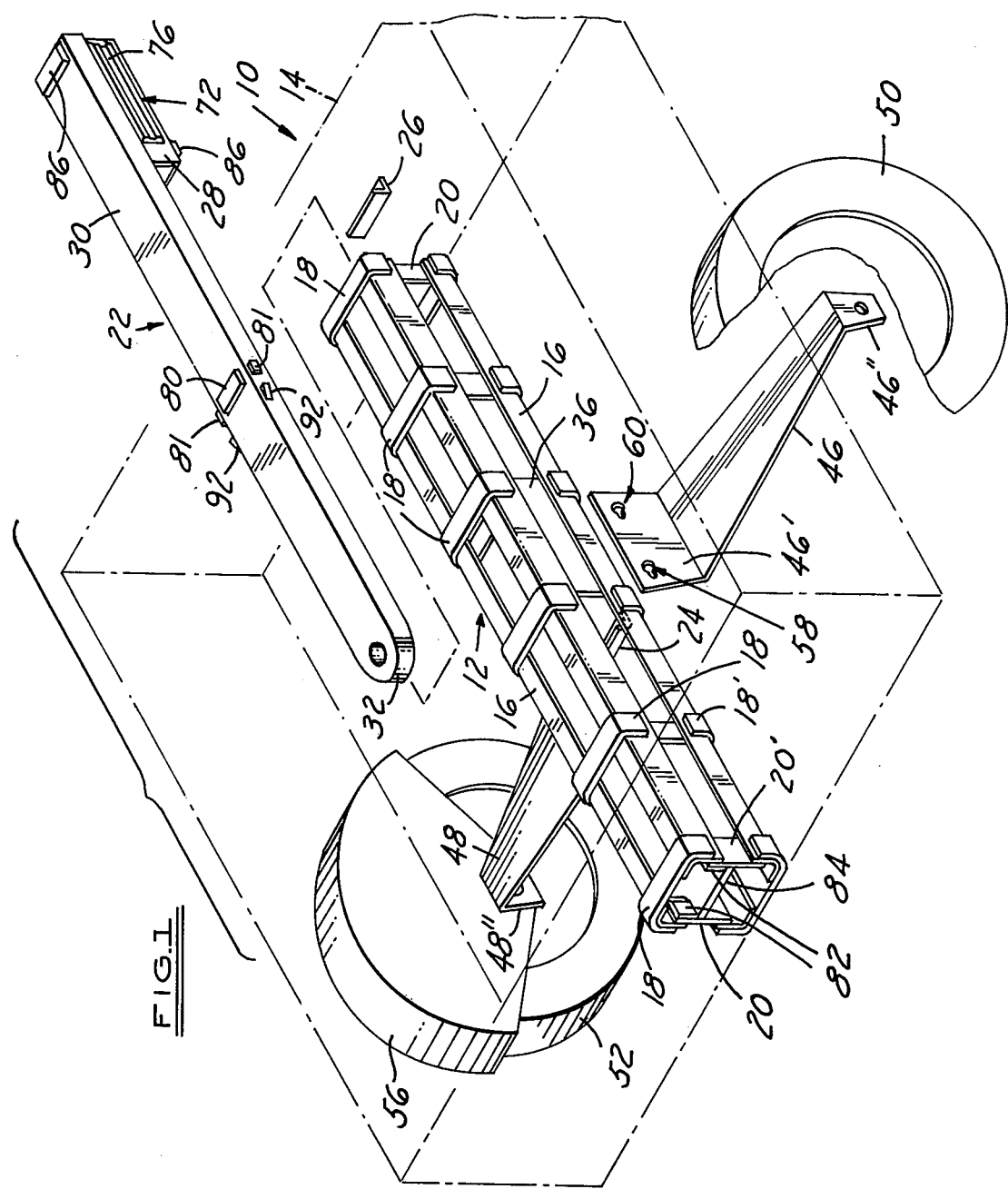
FIG. 1 is an exploded perspective view of a trailer frame assembly in accordance with a presently preferred embodiment of the invention, an exemplary trailer body being illustrated in phantom.

FIGS. 4, 5 and 6 are sectional views taken along the respective lines 4—4, 5—5 and 6—6 in FIG. 3;

FIG. 7 is a view similar to that of FIG. 3 but illustrating the frame assembly with the draw tongue in the retracted position;

FIG. 8 is a partial sectional view taken along the line 8—8 in FIG. 3; and

FIG. 9 is a rear elevational view of the trailer frame assembly carrying a modified trailer body.

Referring to the drawings, a trailer frame assembly 10 in accordance with the invention is illustrated as comprising a relatively long and narrow hollow spine 12 adapted to extend lengthwise of a trailer body 14 (FIGS. 1-3) in the direction of travel thereof. Spine 12 is an assembly of four lengths 16 of angle iron disposed as longerons to define the spine lateral edgers. Upper and lower horizontal U-straps 18 and 18' are disposed externally of the spine enclosure and vertical side straps 20 and 20' are disposed internally in overlapping registration with straps 18, 18', with all the straps being spot welded to angle iron lengths 16 to form a rigid assembly. A trailer hitch draw tongue 22 of hollow rectangular channel stock or the like is telescopically carried internally of spine 12 and is slideable longitudinally therewithin between an extended position illustrated in FIG. 3, in which tongue 22 extends from spine 12 and trailer body 14 for coupling to a tow vehicle trailer hitch (not shown), and a retracted storage position illustrated in FIG. 7 in which the tongue is withdrawn into the spine. A pair of angle brackets 24,26 bridge the lower spine longerons 16 and cooperate with a section 28 of tube or channel stock welded to the underside of the rear portion 30 of tongue 22 to define respective fore and aft tongue stops at the fully extended (FIG. 3) and fully retracted (FIG. 7) positions of draw tongue 22. Note in FIG. 7 that draw tongue 22 is of similar length to spine 12 so that only a small portion at the hitch end 32 of the draw tongue extends from the spine in the retracted position.

A pair of vertical plates 34,36 are welded onto opposite interior sides of spine 12 approximately centrally of the spine length in lieu of straps 20,20' for enhanced balance under trailer loads. A pair of locating and mounting studs 38,40 are affixed to each plate 34,36 internally of spine 12, the studs being longitudinally aligned and spaced from each other in the direction of the spine longitudinal axis. As best seen in FIGS. 4 and 5, each of the studs 38 (and 40) comprise a substantially cylindrical body portion 42 projecting into corresponding apertures in plates 34,36 and welded thereto, and a frustoconical head portion 44 flaring outwardly from body portion 42 and protruding into the spine enclosure. Frame assembly 10 includes a wheel suspension system comprising a pair of tapering monoleaf springs 46,48 adapted at their inboard ends 46',48' to be mounted internally of the trailer spine in a manner to be described. Tire carrying wheels 50,52 are rotatably mounted, as by axle spindles 54 (FIG. 2), at the downwardly bent outboard ends 46",48" of springs 46,48 which may also carry fenders of the type illustrated at 56. The wheels and wheel-mounting spindles may be of any suitable type and need not be further discussed.

As best appreciated with reference to FIG. 7, springs 46,48 include at their inner, upwardly bent wide ends 46' and 48' a pair of longitudinally spaced keyhole apertures 58,60 adapted to be received over respective studs 38,40. Apertures 58,60 include rearward enlarged portions 62,64 adapted to be received over stud head portions 44 (FIGS. 4 and 5), and smaller portions 66,68 extending forwardly from the respective enlarged portions longitudinally of the spine and adapted to be received over the stud cylindrical portions 42. Compression members or pads 70,72 of plastic such as nylon or other suitable material are affixed to opposite external sides of tongue projection 28 and cooperate with stud mounting plates 34,36 rigidly to clamp therebetween the inboard ends 46',48' of leaf springs 46,48 in the extended position of draw tongue 22 when the leaf springs are received over the mounting studs, as best illustrated in FIGS. 4 and 5. Compression pads 70,72 include longitudinally extending channels 74,76 which are adapted to be slideably received over stud head portions 44.

As best illustrated in FIGS. 3, 6 and 8, two pair of forward compression pads 80 and 81 are disposed on the four outside surfaces of tongue 22 and cooperate with corresponding pairs of internally disposed pads 82 and 83, and a lateral bridge member 84 at the mouth of spine 12 firmly to wedge the draw tongue into tight fitting relation with the spine in the extended position of the tongue. Similarly, a pair of rearward pad members 86,86' are disposed one on top of tongue 22 and the other on the bottom of tongue projection 28, and cooperate with corresponding pads 88,88' (FIGS. 3, 5 and 7) disposed internally of spine 12, in combination with the laterally compressive wedging action of spring-retaining pads 70,72, firmly to wedge the rearward end of tongue 22 within the spine in the extended position of the tongue. Thus, tongue 22 is rigidly wedged in its extended position against movement both sideways and vertically relative to the spine. A pair of spring clips 92 (FIG. 1) are riveted internally of tongue 22 slightly forwardly of pads 80 and have inclined yieldable cam fingers projecting laterally outwardly of the tongue through apertures 94 (FIG. 8) adapted to snap into locking abutment against the mouth of spine 12 to releasably lock the tongue in its extended position against longitudinal movement relative to the spine.

In operation, tongue 22 is preassembled at the factory into spine 12, the tongue and spine being shown exploded in FIG. 1 more clearly to illustrate the same. To ready the trailer frame (and trailer) for use, leaf springs 46,48 are positioned, by first registering the enlarged apertures 62,64 over the stud heads 44 and then sliding the leaf springs bodily rearwardly of the spine to bring smaller apertures 66,68 into registry with the stud shanks 42. In this position, the respective leaf springs are located and temporarily held in their operative positions by the studs. The tongue tip 32 (FIG. 7) is then grasped and the tongue is pulled forwardly of the spine to its extended position, at which point compression pads 70,72 cooperate with the opposing stud mounting plates 34,36 rigidly to mount the leaf springs and wheel suspension as previously described. Tongue 22 is firmly held in its extended position against lateral and rotational movement relative to the spine by the wedging action of the tongue and spine pads, and is locked against relative longitudinal movement by spring clips 92 and forward stop 24. To facilitate wedging of the compression pads, a series of notches or indentations 85 (FIG. 4) is provided along the lower face of channel 28. The tip of a screw driver or crowbar may be inserted into one of the notches 85 and levered against bridge 18 to force the draw tongue outwardly during assembly (or inwardly during disassembly).

In the preferred embodiment of the invention illustrated in FIGS. 1-8, body 14 is such that trailer 10 may be stood on end during storage, assembly or disassembly. To disassemble or knock down the trailer frame assembly, spring clips 92 are pressed inwardly from their operative positions illustrated in FIG. 8 until clear of pads 83, and the tongue is then pushed into the spring to the retracted position illustrated in FIG. 7. In the latter position of the tongue, wheel suspension springs 46,48 may be demounted by merely sliding the leaf springs forwardly in the spine until apertures 62,64 (FIG. 7) are axially aligned with stud heads 44, and then moving the respective leaf springs inwardly of the spine until clear of the locating studs, whereupon the leaf springs are free to be pulled out from the underside of the spine.

It will be appreciated that the trailer frame assembly provided by the present invention, a preferred embodiment of which has been described in detail hereinabove, is susceptible to a wide variety of modification and variations. For example, it is entirely feasible and within the scope of the present invention to provide "hard" wheel suspension means, although soft or a spring-mounted wheel suspension as previously described is preferred. Similarly, it is envisioned that the invention in its broadest aspects may be useful in connection with one-wheel trailers in many applications. The box-like trailer body 14, which serves as the load receiving compartment of the trailer, preferably is constructed so as to have a longitudinally extending central groove in its underside complementary in cross section to spine 12 and adapted to snugly receive spine 12 therein to help mount and firmly retain body 14 on trailer 12 in balanced cantilever fashion. However, body 14 may be readily replaced by other load-receiving bodies such as in the flatbed trailer illustrated in FIG. 9. In FIG. 9, trailer body 96 comprises a pair of bed members 98 centrally and pivotably mounted by a hinge 100 longitudinally carried by spine 12. Eye hooks 102 cooperate with an elastic strap or the like 104 for affixing a load 106 on the trailer body. Similar straps (not shown) may extend from hooks 102 beneath spine 14 to help retain bed members 98 in their folded-down, load-receiving positions. The trailer frame assembly in FIG. 9, including wheel suspension springs 46,48, etc., is otherwise identical to that previously described.

In the foregoing description and the appended claims, positional or directional adjectives such as "forwardly", "rearwardly", "upwardly", etc. are employed by way of description and not by way of limitation with respect to the orientation of the structure as viewed in the drawing figures. It will be understood that many of the positional and/or directional aspects of the preferred embodiment may be inverted or otherwise reoriented without altering the functional interrelationship of the elements as described and claimed.

The invention claimed is:

1. A trailer frame and suspension system comprising a hollow spine adapted to extend lengthwise of a trailer body, a trailer draw tongue telescopically carried within said spine and slideable longitudinally therewithin between a tow position in which said tongue extends from said spine for coupling to a tow vehicle and a retracted storage position in which said tongue is withdrawn into said spine, means for suspending a ground-engaging trailer wheel from said spine and including a portion adapted to be located internally of said spine adjacent said draw tongue, and opposed clamping means carried by said tongue and said spine internally of said spine and having a releasing relationship with said portion of said wheel suspension means to condition said suspension for removal from said frame in the retracted position of said draw tongue and operable in the extended tow position of said draw tongue for rigidly clamping said portion within said spine and thereby mounting said wheel suspension means on said frame such that said wheel is cantilevered from within said spine.

2. A wheel suspension system comprising a first member adapted to be fixedly mounted to a wheeled vehicle frame, a second member carried adjacent said first member and slideable with respect thereto between first and second positions, wheel suspension means including a vehicle wheel, first means carried by said first member for detachably mounting said wheel suspension means onto said first member in the first position of said second member, and second means carried by said second member for opposed registry with said first means in the second position of said second member to firmly clamp said suspension means between said first and second means, and thus prevent removal of said wheel suspension means from said first member when said second member is in said second position.

3. The wheel suspension system set forth in claim 2 wherein said first means comprises stud means fixedly carried by said first member, wherein said second means comprises compression means carried by said second member for selective registry with said stud means, and wherein said wheel suspension means comprises leaf spring means having a wheel rotatably carried at one end and aperture means at the opposing end adapted to be received over said stud means and rigidly captured thereon by said compression means when the latter is positioned in registry with said stud means member such that said rotatable wheels are positioned on laterally opposite sides of said first member.

4. The wheel suspension system set forth in claim 2 or 3 wherein said wheel suspension means comprises first and second leaf springs each carrying a rotatable wheel, and wherein said first and second means are adapted to clamp said first and second leaf spring on said first.

5. The wheel suspension system set forth in claim 4 wherein said stud means comprises a pair of longitudinally spaced studs carried on opposite lateral sides of said first member, and wherein said aperture means comprises a pair of apertures in each said leaf spring adapted to be received over said studs.

6. The wheel suspension system set forth in claim 2 or 3 in a trailer frame and suspension system assembly wherein said first member comprises an elongated hollow spine adapted to extend lengthwise of a trailer body, and wherein said second member comprises a trailer draw tongue telescopically carried within said spine and slidable longitudinally between an extended tow position corresponding to said second position in which said tongue extends from said spine for coupling to a tow vehicle and a retracted storage position corresponding to said first position in which said tongue is withdrawn into said spine.

7. A trailer frame and suspension system comprising a hollow spine adapted to extend lengthwise of a trailer body, a trailer draw tongue telescopically carried within said spine and slideable longitudinally between a tow position in which said tongue extends from said spine for coupling to a tow vehicle and a retracted storage position in which said tongue is withdrawn into said spine, means for suspending a ground-engaging trailer wheel from said spine, and opposed means carried by said tongue and said spine having a releasing relationship with said wheel suspension means to condition the same for removal from said frame in the retracted position of said draw tongue and operable in the extended tow position of said draw tongue for rigidly mounting said wheel suspension means on said frame, said opposed means comprising first means carried by said spine for detachably positioning said wheel suspension means with respect to said spine in the retracted position of said draw tongue and second means carried by said draw tongue for opposed registry with said first means when said tongue is placed in said extended position to firmly clamp said suspension means between said first and second means and to prevent removal therefrom.

8. The trailer frame and suspension system set forth in claim 7 wherein said first means comprises locating means carried internally of said spine and cooperable with said wheel suspension to locate said wheel suspension means in functional position, and wherein said second means includes means carried externally of said spine for opposed registry with said locating means in said extended position of said tongue, said second means being longitudinally spaced within said spine from said locating means in said retracted position of said tongue such that said wheel suspension means may be selectively withdrawn from within said spine.

9. The trailer frame and suspension system set forth in claim 8 wherein said opposed means comprises stud means fixedly carried internally of said spine and pad means carried by said tongue for selective registry with said stud means, and wherein said wheel suspension means comprises leaf spring means including a wheel rotatably carried at one end of said leaf spring means and aperture means at the opposing end adapted to be received over said stud means and rigidly captured thereon by said pad means when the latter is positioned in registry with said stud means.

10. A trailer frame and suspension system comprising a hollow spine adapted to extend lengthwise of a trailer body, a trailer draw tongue telescopically carried within said spine and slideable longitudinally between a tow position in which said tongue extends from said spine for coupling to a tow vehicle and a retracted storage position in which said tongue is withdrawn into said spine, means for suspending a ground-engaging trailer wheel from said spine, and opposed means carried by said tongue and said spine having a releasing relationship with said wheel suspension means to condition the same for removal from said frame in the retracted position of said draw tongue and operable in the extended tow position of said draw tongue for rigidly mounting said wheel suspension means on said frame, said opposed means comprising stud means fixedly carried internally of said spine and pad means carried by said tongue for selective registry with said stud means, said wheel suspension means comprising leaf spring means including a wheel rotatably carried at one end of said leaf spring means and aperture means at the opposing end adapted to be received over said stud means and rigidly captured thereon by said pad means when the latter is positioned in registry with said stud means for preventing removal of said wheel suspension means in said tow position of said draw tongue.

11. A trailer frame and suspension system comprising a hollow spine adapted to extend lengthwise of a trailer body, a trailer draw tongue telescopically carried within said spine and slideable longitudinally between a tow position in which said tongue extends from said spine for coupling to a tow vehicle and a retracted storage position in which said tongue is withdrawn into said spine, means for suspending a ground-engaging trailer wheel from said spine, and opposed means carried by said tongue and said spine having a releasing relationship with said wheel suspension means to condition the same for removal from said frame in the retracted position of said draw tongue and operable in the extended tow position of said draw tongue for rigidly mounting said wheel suspension means on said frame, said wheel suspension means comprising first and second leaf springs each carrying a rotatable wheel, said opposed means being adapted to clamp said first and second leaf springs, for preventing removal of said wheel suspension means in said tow position of said draw tongue, such that said rotatable wheels are positioned on laterally opposite sides of said spine.

12. The trailer frame and suspension system set forth in claim 1, 4 or 10 wherein said wheel suspension means comprises first and second leaf springs each including a rotatable wheel, and wherein said stud and pad means are adapted to clamp said first and second leaf springs within said spine such that said rotatable wheels are positioned on laterally opposed sides of said spine with said draw tongue disposed snugly between said one ends of said leaf springs.

13. The trailer frame and suspension system set forth in claim 12 wherein said stud means comprises a pair of longitudinally spaced studs carried on each side of said spine, and wherein said aperture means comprises a pair of apertures in each said leaf spring and adapted to be received over said studs.

14. The trailer frame and suspension system set forth in claim 6 wherein each of said studs comprises a substantially cylindrical body portion internally coupled to said spine and a head portion outwardly flaring from said body portion, and wherein each of said apertures is substantially keyhole shaped, including an enlarged portion adapted to be received over said stud head portion and a smaller portion extending longitudinally of said spine and adapted to be laterally received over said stud cylindrical portion, such that said leaf springs may be selectively positioned over and temporarily held by said studs as said tongue moves from said retracted position to said extended position.

15. The trailer frame and suspension system set forth in claim 7, 10 or 11 further comprising second opposed means carried by said spine and said tongue for firmly wedging said tongue in said extended position.

16. The trailer frame and suspension system set forth in claim 15 further comprising spring clip means carried by said tongue and cooperable with said spine selectively to lock said tongue in said extended position against movement longitudinally of said spine.

17. The trailer frame and suspension system set forth in claim 8 further comprising stop means carried by said spine to limit sliding movement of said tongue between said extended and retracted positions.

18. The trailer frame and suspension system set forth in claim 7, 10 or 11 further comprising a trailer body fixedly carried by said spine.

19. The trailer frame and suspension system set forth in claim 7, 10 or 11 further comprising a load-receiving box-like trailer body having a bottom wall with a central groove extending therealong adapted snugly to receive said trailer spine therein for releasably mounting said body on said spine.

20. The trailer frame assembly set forth in claim 7 or 21 wherein said wheel suspension means comprises first and second leaf springs each carrying a rotatable wheel, and wherein said opposed means are adapted to clamp said first and second leaf springs such that said rotatable wheels are positioned on laterally opposite sides of said spine.

21. A trailer frame and suspension system comprising a hollow spine adapted to extend lengthwise of a trailer body, a trailer draw tongue telescopically carried within said spine and slideable longitudinally between a tow position in which said tongue extends from said spine for coupling to a tow vehicle and a retracted storage position in which said tongue is withdrawn into said spine, means for suspending a ground-engaging trailer wheel from said spine, opposed means carried by said tongue and said spine having a releasing relationship with said wheel suspension means to condition the same for removal from said frame in the retracted position of said draw tongue and operable in the extended tow position of said draw tongue for rigidly mounting said wheel suspension means on said frame and preventing removal therefrom, and a load-receiving box-like trailer body having a bottom wall with a central groove extending therealong adapted snugly to receive said trailer spine therein for releasably mounting said body on said spine.

22. A trailer frame and suspension system comprising a hollow spine adapted to extend lengthwise of a trailer body, a trailer draw tongue telescopically carried by said spine and slideable longitudinally therealong between a tow position in which said tongue extends from said spine for coupling to a tow vehicle and a retracted storage position in which said tongue is withdrawn into telescoped position with said spine, means for suspending a ground-engaging trailer wheel from said spine and including a portion adapted to be located adjacent mutually overlapping surfaces of said spine and said draw tongue, and opposed clamping means carried by said mutually overlapping surfaces of said tongue and said spine having a releasing relationship with said portion of said wheel suspension means to condition said suspension for removal from said frame in the retracted position of said draw tongue and operable in the extended tow position of said draw tongue for rigidly clamping said portion on said spine and preventing removal therefrom, and thereby mounting said wheel suspension means on said frame such that said wheel is cantilevered from said spine.

* * * * *

UNITED STATES PATENT AND TRADEMARK OFFICE
CERTIFICATE OF CORRECTION

PATENT NO. : 4,196,918

DATED : April 8, 1980

INVENTOR(S) : Don S. Strader

It is certified that error appears in the above-identified patent and that said Letters Patent are hereby corrected as shown below:

Claim 3, Column 4, lines 66, 67 and 68:

Cancel "member such that said rotatable wheels are positioned on laterally opposite sides of said first member"

Claim 4, Column 5, line 5:

After "first", second occurrence, insert

-- member such that said rotatable wheels are positioned on laterally opposite sides of said first member. --

*Signed and Sealed this*

*Fifteenth* Day of *July 1980*

[SEAL]

*Attest:*

SIDNEY A. DIAMOND

*Attesting Officer*      *Commissioner of Patents and Trademarks*